Figure 1:
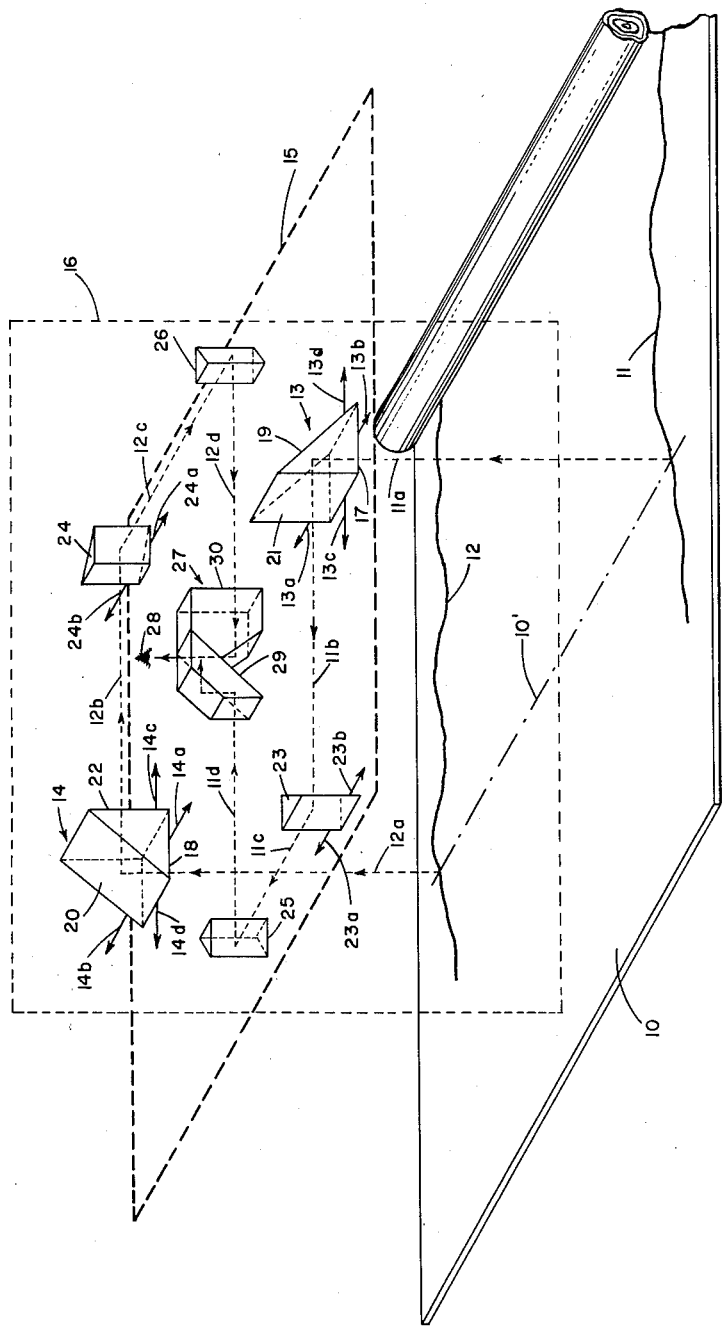

INVENTOR.
PIERRE de CHAMBRIER
BY Robert Hockfield
HIS ATTORNEY

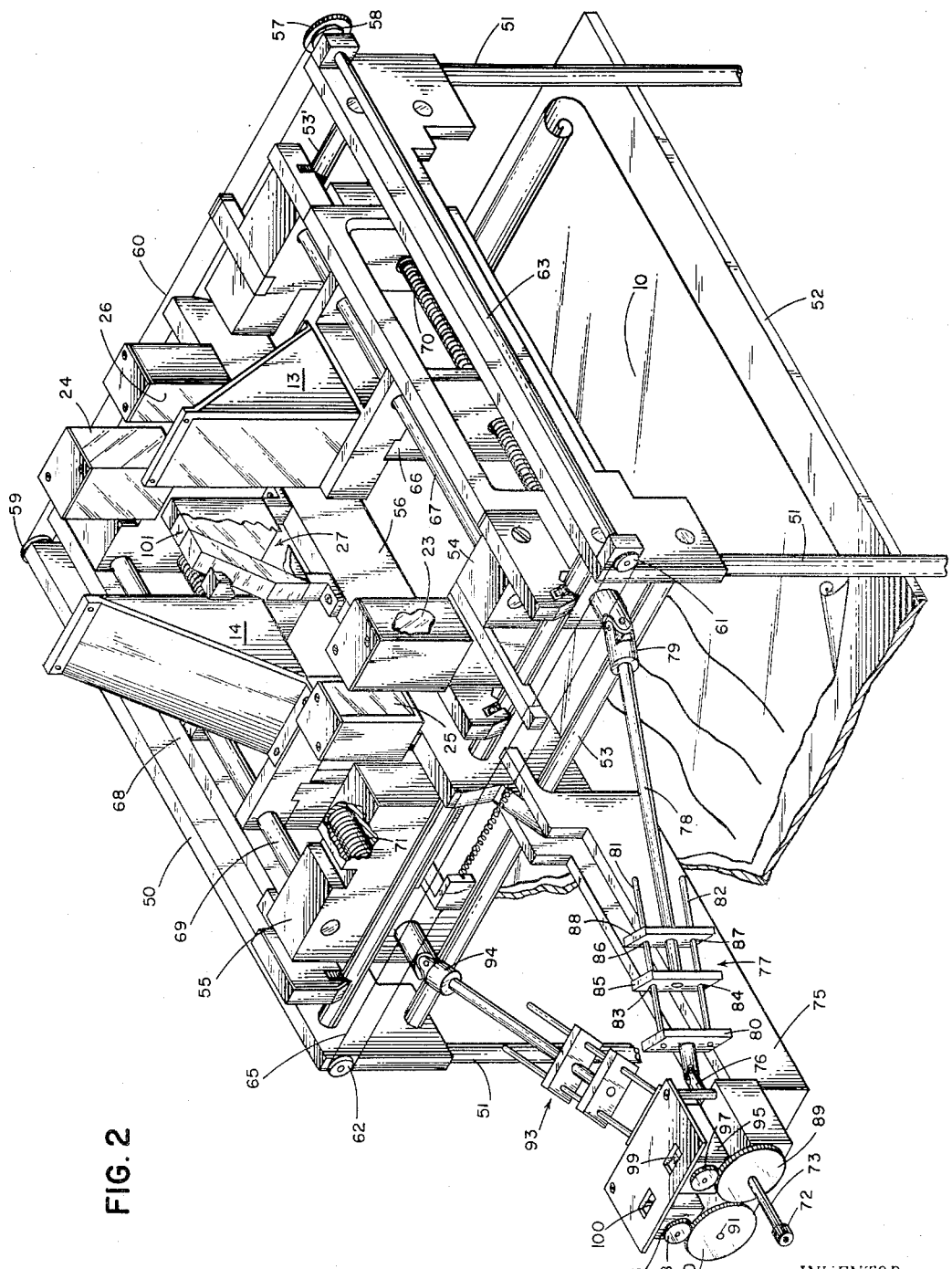

No. 2,754,719

United States Patent Office

Patented July 17, 1956

2,754,719

METHODS AND APPARATUS FOR DETERMINING DISPLACEMENT BETWEEN CURVES

Pierre de Chambrier, Ridgefield, Conn., assignor to Schlumberger Well Surveying Corporation, Houston, Tex., a corporation of Delaware Application August 16, 1954, Serial No. 450,041

7 Claims. (Cl. 88—14)

This invention relates to correlating methods and apparatus and, more particularly, pertains to new and improved methods and apparatus utilizing optical techniques for determining the longitudinal displacement between a pair of transversely separated curves.

While the invention may be useful in a variety of applications, it is ideally suited for use in association with curve-carrying records such as produced by apparatus intended for the determination of the dip of strata traversed by a borehole, for example, as disclosed in either of Patents Nos. 2,176,169 and 2,427,950 of Henri-Georges Doll. For convenience, the invention will be described in this connection.

According to the disclosures in the above-cited patents, records are made of functions of a characteristic of the earth formations at laterally spaced points in the borehole, preferably in the vicinity of a boundary between one formation and an adjacent formation. At least three points are chosen in a plane perpendicular to the axis of the borehole.

A continuous record is made of the functions of the formation characteristic determined at each of the three points, and usually the three resulting curves are recorded on a single record sheet. These curves are transversely displaced from one another and the dip of a formation may be determined by measuring the longitudinal displacement among the curves at sections depicting a boundary of a formation and using these data to perform certain known computations.

Heretofore, the determination of longitudinal displacement has been accomplished through the use of a copy of the original record on a transparent paper wherein the curves are recorded as opaque lines. The transparent copy is placed over the original and is displaced laterally until a first and a second of the curves are transversely aligned, and then is displaced longitudinally until these curves are in substantial longitudinal alignment. The longitudinal displacement between the curves is determined by measuring the amount that the transparent copy has been shifted longitudinally. The same operation may then be performed between the second curve and a third curve.

This procedure for determining the displacement of curves is generally satisfactory since it permits observation of extensive segments of the curves to be compared. Consequently, minor differences in the shapes of the curves may not reduce the accuracy of the measurements. However, both the original record as well as a transparent copy must be employed. Moreover, the records very often are many feet in length and the required alignment for a desired number of sections is often tedious and time-consuming.

It is, therefore, an object of the present invention to provide new and improved methods and apparatus for correlating curves which obviates the above-noted deficiencies of a prior method.

Another object of the present invention is to provide new and improved methods and apparatus for correlating curves adapted to employ a single record on which the curves to be compared are displaced transversely relative to one another.

Still another object of the present invention is to provide new and improved methods and apparatus for correlating curves wherein operation is not impaired by the length of the record on which the curves to be compared may be viewed.

A further object of the present invention is to provide a new and improved curve correlator which is simple and inexpensive to construct and yet is entirely efficient and accurate in operation.

In accordance with the method of determining the longitudinal displacement between a pair of transversely separated curves embodying the instant invention, images of the curves are formed at an image plane, and the images are displaced relative to one another into substantially transverse alignment. In addition, the images of the curves are displaced relative to one another into substantially longitudinal alignment, and an indication is obtained representing the amount of relative longitudinal shift between the images needed to bring about the longitudinal alignment.

The present invention also features correlating apparatus for carrying out the above method. This apparatus comprises a pair of optical elements supported for movement in a reference plane parallel to an object plane wherein the curves to be correlated may be viewed. The optical elements are disposed on opposite sides of a transverse plane positioned perpendicularly to the reference plane, and they include means for intercepting and redirecting light from the observed plane in opposite directions parallel to the reference and transverse planes. Means are provided for directing light from each of the optical elements so as to form images of the curves at an image plane. The correlating apparatus further comprises means ganging the optical elements for simultaneous but opposite relative movement perpendicular to the transverse plane for displacing the images of the curves at the image plane into substantially transverse alignment, and means ganging the otpical elements for simultaneous but opposite relative movement parallel to the transverse plane for displacing images of the curves at the image plane into substantially longitudinal alignment. Means are provided for indicating relative displacement of the optical elments parallel to the transverse plane.

The novel features of the present invention are set forth with particularly in the appended claims. The present invention, both as to its organization and manner of operation, together with further objects and advantages thereof, may best be understood by reference to the following description taken in connection with the accompanying drawings in which:

Fig. 1 is a simplified perspective view of a curve correlator embodying the present invention, illustrating only the optical components of the device; and Fig. 2 is a complete perspective view of a curve correlator constructed in accordance with the present invention, certain portions thereof being shown broken away so as to reveal various details.

Referring now to Fig. 1 of the drawings, a curve correlator embodying the present invention is shown in operative association with a record sheet 10 carrying curves 11 and 12. Although in the environment for the invention discussed hereinbefore three curves are employed, only two are illustrated in Fig. 1 for the sake of simplicity. It will be understood, however, that the record 10 may include any number of curves and the apparatus embodying the invention may be employed for determining the longitudinal displacement of a selected pair of transversely separated curves.

The curve correlator comprises a pair of principal optical elements 13 and 14 supported for movement in a reference plane denoted by the rectangle 15 drawn in dashed lines arranged parallel to an object plane defined by record sheet 10 wherein the curves to be compared may be viewed. Optical elements 13 and 14 are disposed on opposite sides of a transverse plane illustrated by dashed rectangle 16 perpendicular to reference plane 15, and they may be in the form of right-angle prisms having light-transmitting surfaces 17 and 18, respectively, in plane 15. They also comprise light-reflecting surfaces 19 and 20 arranged perpendicularly to transverse plane 16 and oriented at opposite 45° angles relative to plane 15. The optical elements 13 and 14 thus include means for intercepting light from observed plane 10 and redirecting it in opposite directions parallel both to reference plane 15 and transverse plane 16. Such redirected light is emitted via surfaces 21 and 22 of the prisms which are arranged transversely to the reference and transverse planes.

The curve correlator further includes a right-angle prism 23 positioned to intercept light from optical element 13 and redirect it toward transverse plane 16, and another right-angle prism 24 for redirecting light from optical element 14 toward the transverse plane. Another pair of right-angle prisms 25 and 26 are disposed in transverse plane 16 and are oriented so that light from the prisms 23 and 24 is reflected toward an image-superposing element 27. Element 27 may be a conventional type of "beam-splitter" utilized in reverse operative relation so as to combine the light from both of prisms 25 and 26 and form a superimposed image at an image plane represented by an eye 28 of an observer. For example, device 27 may be constructed in the manner illustrated comprising a trapezoidally-shaped prism 29 having a portion of its base in optical contact with a light-transmitting inclined surface of a wedge-shaped prism 30. It is thus apparent that means are provided for directing light from each of optical elements 13 and 14 toward an image plane.

A mechanism to be later described is provided for ganging optical elements 13 and 14 for simultaneous but opposite relative movement perpendicular to transverse plane 16 and for simultaneous but opposite relative movement parallel to transverse plane 16. Prism 23 accompanies element 13 in its movement perpendicular to plane 16 and prism 24 accompanies element 14 in such movement. However, insofar as movement parallel to plane 16 is concerned, prisms 23 and 24 are fixed. Prisms 25, 26 and beam-splitter 27 are fixed relative to reference plane 15.

As will be later described, the apparatus includes means for indicating relative displacement of optical elements 13 and 14 parallel to transverse plane 16. Accordingly, when a predetermined relationship in the superimposed images is obtained, a reading of the indicator may provide a measure of the longitudinal displacement of curves 11 and 12.

In operation, light from a point on curve 11 travels along path 11a, illustrated in dashed lines, and is reflected by surface 19 of element 13 in direction 11b parallel to planes 15 and 16. Prism 23 redirects such light toward transverse plane 16 along a path 11c and then the light is reflected by prism 25 along path 11d in the transverse plane. Light along path 11d enters element 29 of beam-splitter 27 and after experiencing three reflections, as illustrated, is projected toward observation point 28.

Light from a point on curve 12 traverses path 12a and is reflected by optical element 14 in a direction 12b parallel to planes 15 and 16. Thereafter, the light is redirected by prism 24 toward transverse plane 16 along path 12c and is again redirected by prism 26 along path 12d in the transverse plane. Light along path 12d enters element 30 of beam-splitter 27 and after a single reflection, traverses the optically coupled surfaces of elements 29 and 30 with substantially no refraction or reflection and thus is essentially superposed with the light entering the beam-splitter along path 11d.

It is thus apparent that although curves 11 and 12 are transversely displaced relative to one another, a superimposed image may be formed. If the transverse distance between the curves is smaller than shown, optical elements 13 and 14 are simultaneously and manually displaced in directions illustrated by arrows 13a and 14a toward transverse plane 16 until transverse alignment is attained at observation point 28. Of course, each element is accompanied in this movement by prisms 23 and 24 in the directions represented by arrows 23a and 24a. If, on the other hand, curves 11 and 12 are spaced by a greater distance than that shown, optical elements 13 and 14 are simultaneously moved in respective directions 13b and 14b away from transverse plane 16, being accompanied in such movement by displacement of prisms 23 and 24 in directions 23b and 24b, respectively. Accordingly, the curve correlator embodying the present invention may accommodate a wide variety of transverse separations between the curves to be compared, and the images of the curves formed at the image plane may be brought into substantially transverse alignment.

In describing the operation of the invention in the determination of the longitudinal displacement of curves 11 and 12, it is initially assumed that curves 11 and 12 are longitudinally aligned with respect to a transverse axis 10' in sheet 10. If, for example, the longitudinal displacement is such that curve 11 is displaced to the left of axis 10', as viewed in Fig. 1, and curve 12 is displaced to the right of axis 10', the images of the curves at the image plane may be brought into substantially longitudinal alignment by displacing optical element 13 to the left, or in the direction of arrow 13c, simultaneously with the displacement of optical element 14 to the right, or in the direction of arrow 14c. When such coincidence is obtained at the image plane, a measurement of relative movement between optical elements 13 and 14 provides a measure of the longitudinal displacement between curves 11 and 12. If the curves are longitudinally separated in the opposite direction, optical elements 13 and 14 are simultaneously displaced in opposite directions 13d and 14d until coincidence is achieved and a reading of the displacement between the optical elements is then taken. Accordingly, the longitudinal displacement of a pair of curves may be determined with speed and facility through the use of a curve correlator embodying the present invention.

The mechanical details of a device for imparting the movements to the various optical elements described hereinbefore are illustrated in Fig. 2. This device comprises a rectangular frame 50 supported at its corners by a plurality of legs 51 extending a preselected height above a table 52 on which record sheet 10 may be suitably supported, such as by a system of supply and take up rolls (not shown). Frame 50 mounts a pair of cylindrical, transverse, side rails 52 and 53 on which a pair of principal carriages 54 and 55 are supported for sliding movement toward and away from a longitudinal partition 56 which extends between the side rails 53 and 53'.

In order to gang carriages 54 and 55 for simultaneous but opposite movement relative to one another, there is provided a control knob 57 adjacent to and coupled to a pulley 58 which together with another pulley 59 supports an endless belt or cable 60. Carriage 54 is attached to an upper portion of cable 60, while carriage 55 is attached to a lower portion of the cable, thereby providing opposite movement for the carriages. An auxiliary cable-pulley system is provided and comprises pulleys 61 and 62, the former of which is coupled by a shaft 63 to pulley 58. An endless cable or belt 65 supported by pulleys 61 and 62 is connected to carriages 54 and 55 in a manner like that employed for cable 60.

An auxiliary carriage 66 is slidably supported by a cylindrical rail 67 extending along principal carriage 54 in a direction perpendicular to side rails 53 and 53'. Similarly, an auxiliary carriage 68 is slidably supported on a cylindrical rail 69 extending along principal carriage 55. The auxiliary carriages 66 and 68 may be displaced by means of individual lead screws 70 and 71 rotatably mounted on the principal carriages.

To drive the lead screws, a control knob 72 is provided. The knob is fixed to one end of a shaft 73 rotatably supported by a bearing member 74 of a bracket 75 which extends laterally from frame 50. The other end of shaft 73 is connected to a universal coupling 76 connected by a sliding, keyed coupling 77, to a shaft 78. Shaft 78 is connected by another universal coupling 79 to one end of lead screw 70. The universal couplings 76 and 79 and the sliding coupling 77 are employed to accommodate movement of principal carriage 54.

Although any conventional type of sliding coupling may be utilized, coupling 77 preferably is comprised of a transverse support 80 fixed to member 76 and from which a pair of rails 81 and 82 extends parallel to the exit axis of member 76. The rails 81 and 82 are received in close, sliding relationship by openings 83 and 84 of a first transverse member 85 and by openings 86 and 87 of a second transverse member 88. The members 85 and 88 are fixed to shaft 78 in spaced relationship and serve to maintain shaft 78 in alignment with the exit axis of coupling 76. Since members 85 and 88 are slidably connected to rails 81 and 82, shaft 78 may move axially relative to the exit axis of coupling 76, but the shaft is keyed by the rails so that it rotates with the coupling. Accordingly, a sliding, keyed connection is provided wherein backlash is minimized.

Shaft 73 is provided with a gear 89 that is coupled to a gear 90, in turn, fixed to a shaft 91. The latter shaft is rotatably supported by bearing member 74 and it is connected via a universal coupling (not shown), a sliding, keyed coupling 93 which may be similar to coupling 77, and a universal coupling 94 to one end of lead screw 71.

The directions of threads on the lead screws 70 and 71 are arranged so that the auxiliary carriages are simultaneously displaced in opposite relative directions in response to rotation of control knob 72.

A pair of counters 95 and 96 is included in the apparatus and each is provided with one of gears 97 and 98 which are in meshing engagement with gears 89 and 90, respectively. The counters include turns indicators 99 and 100.

Optical element 13 is supported by carriage 66 and optical element 14 is supported by carriage 68, whereas the prisms 23 and 24 are supported by principal carriages 54 and 55, respectively. The fixed portions of the optical system including prisms 25 and 26 and beam-splitter 27 are suitably supported on fixed partition 56.

Preferably the record 10 and its spooling mechanism (not shown) should be movable toward and away from transverse plane 16 so that the images of a selected pair of curves may be brought into the field of view obtained by an observer in placing his eye in the vicinity of the viewing aperture of beam splitter 27.

From the foregoing description, it is evident that optical elements 13 and 14 may be simultaneously displaced, but in opposite relative directions, toward and away from the transverse plane, referred to hereinbefore, by manual manipulation of control knob 57 and are accompanied in such movement by prisms 23 and 24. Accordingly, an observer may bring the images of the curves to be compared into substantially transverse alignment. Thereafter, by manual manipulation of control knob 72, the carriages 66 and 68 may be driven in opposite relative directions until the images of the curves are brought into substantially longitudinal alignment. By setting the turns counters 95 and 96 at their respective zeros for the reference condition 10' illustrated in Fig. 1, the numbered reading visible at only one of the indicators 99 and 100 will be observed to increase in a positive sense as the images are brought into alignment. Accordingly, one of the turns counters may be employed to indicate positive displacement and the other negative displacement so that an indication may be obtained of the amount as well as the sense of the longitudinal displacement between the curves to be compared. By appropriately calibrating the turns counters, the readings observed at indicators 99 and 100 may provide a direct indication of the longitudinal displacement between the transversely separated curves. Of course, in lieu of such a calibration, a suitable calibration chart may be employed to obtain the displacement.

After a section of the record sheet 10 has been analyzed and the displacements noted, the take up and supply rolls (not shown) are rotated to bring another portion of the record into view and the above-described procedure may be repeated. Thus, any number of sections of the record may be easily and conveniently examined and the efficiency of operation is not adversely affected by the length of the record sheet.

It is, therefore, evident that a curve correlator constructed in accordance with the present invention may be used with speed and facility for determining longitudinal displacement of a pair of curves and is not subject to the deficiencies of prior procedures. Inasmuch as the portion of the record sheet viewed is relatively large, extensive segments of the curves may be observed and minor differences between the curves do not reduce the accuracy of the determinations. If desired, the field of view may be increased by elongating legs 51.

Since relatively simple optical elements are utilized, namely prisms, these elements may be fabricated with a high degree of precision at a cost substantially lower than more complex forms. Accordingly, the correlator embodying the present invention may be employed to make determinations with a high degree of accuracy and yet may be constructed at a relatively low cost.

If desired, plane mirrors may be substituted for the prisms 13, 14, 23, 24, 25 and 26.

Although the curves to be compared are illustrated as being disposed in a plane parallel to the reference plane, obviously a suitable reflection system may be employed so that the curves are in a different plane and their image may be viewed in an object plane which is parallel to the reference plane.

Of course, instead of the images being formed so that they may be viewed directly by the eye of an observer, they may be formed at a viewing screen through the agency of a suitable projection lens system. Accordingly, the image plane convenient for direct viewing as in Fig. 1 may be the object plane of another arrangement of optical elements which forms the images at another image plane.

If desired, a suitable beam splitter may be employed so that the images to be compared are formed at both eyes of an observer, in a known manner.

While a particular embodiment of the present invention has been shown and described, it is apparent that changes and modifications may be made without departing from this invention in its broader aspects, and, therefore, the aim in the appended claims is to cover all such changes and modifications as fall within the true spirit and scope of this invention.

I claim:

1. A method of determining the longitudinal displacement between a pair of transversely separated curves inscribed on a common medium which comprises the steps of: forming images of the portions of the common medium containing respective ones of the curves at an image plane; displacing said images relative to one another to bring the curve images into substantially transverse alignment; displacing said images relative to one another to bring the curve images into substantially longitudinal alignment; and obtaining an indication representing the amount of longitudinal displacement required to bring about said longitudinal alignment.

2. A method of determining the longitudinal displacement between curves obtained by recording on a common medium functions of a characteristic of earth formations at three laterally spaced points in a borehole traversing the formations, said method comprising the steps of: forming images of portions of the common medium containing respective ones of a selected pair of said curves at an image plane; displacing said images relative to one another to bring the curve images into substantially transverse alignment; displacing said images relative to one another to bring the curve images into substantially longitudinal alignment; and obtaining an indication representing the amount of longitudinal displacement required to bring about said longitudinal alignment.

3. A curve correlator for determining the longitudinal displacement of a pair of transversely separated curves comprising: a pair of optical elements supported for movement in a reference plane parallel to an object plane wherein the curves to be correlated may be viewed, said optical elements being disposed on opposite sides of a plane transverse to said reference plane and including means for intercepting and redirecting light from said observed plane in opposite directions parallel to said reference and said transverse planes; means for directing light from each of said optical elements toward an image plane; means ganging said optical elements for simultaneous but opposite relative movement perpendicular to said transverse plane for displacing the images of the curves at said image plane into substantially transverse alignment; means ganging said optical elements for simultaneous but opposite relative movement parallel to said transverse plane for displacing the images of the curves at said image plane into substantially longitudinal alignment; and means for indicating relative displacement of said optical elements parallel to said transverse plane.

4. A curve correlator for determining the longitudinal displacement of a pair of transversely separated curves comprising: a pair of mirror elements supported for movement in a reference plane parallel to an object plane wherein the curves to be compared may be viewed, said mirror elements being disposed on opposite sides of a plane transverse to said reference plane and having reflective surfaces defining respective planes perpendicular to one another and to said transverse plane, and said respective planes being inclined relative to said reference plane at angles substantially equal to forty-five degrees; means for directing light from each of said mirror elements toward an image plane; means ganging said mirror elements for simultaneous but opposite relative movement perpendicular to said transverse plane for displacing the images of the curves at said image plane into substantially transverse alignment; means ganging said mirror elements for simultaneous but opposite relative movement parallel to said transverse plane for displacing the images of the curves at said image plane into substantially longitudinal alignment; and means for indicating relative displacement of said mirror elements parallel to said transverse plane.

5. A curve correlator for determining the longitudinal displacement of a pair of transversely separated curves comprising: a pair of optical elements supported for movement in a reference plane parallel to an object plane wherein the curves to be compared may be viewed, said optical elements being disposed on opposite sides of a plane transverse to said reference plane and including means for intercepting and redirecting light from said observed plane in opposite directions parallel to said reference and said transverse planes; means for directing light from each of said optical elements toward an image plane including a first pair of reflectors individually spaced from one of said optical elements in a corresponding one of said opposite directions for reflecting light from said optical elements toward said transverse plane, a second pair of reflectors disposed essentially in said transverse plane for reflecting light from said first pair of reflectors toward a selected location in said reference and said transverse planes, and an image-superposing element positioned at said location; means ganging said optical elements and said first pair of reflectors for simultaneous but opposite relative movement perpendicular to said transverse plane for displacing the images of the curves at said image plane into substantially transverse alignment; means ganging said optical elements for simultaneous but opposite relative movement parallel to said transverse plane for displacing the images of the curves at said image plane into substantially longitudinal alignment; and means for indicating relative displacement of said optical elements parallel to said transverse plane.

6. A curve correlator for determining the longitudinal displacement of a pair of transversely separated curves comprising: a pair of principal carriages supported for movement in a reference plane parallel to an object plane wherein the curves to be compared may be viewed, and disposed on opposite sides of a plane transverse to said reference plane; a pair of auxiliary carriages individually supported for movement relative to one of said principal carriages in a direction parallel to said transverse plane; a pair of optical elements individually supported by one of said auxiliary carriages, and said optical elements including means for intercepting and redirecting light from said observed plane in opposite directions parallel to said reference and said transverse planes; means for directing light from each of said optical elements toward an image plane; means ganging said principal carriages for simultaneous but opposite relative movement perpendicular to said transverse plane for displacing the images of the curves at said image plane into substantially transverse alignment; means ganging said auxiliary carriages for simultaneous but opposite relative movement parallel to said transverse plane for displacing the images of the curves at said image plane into substantially longitudinal alignment; and means for indicating relative displacement of said auxiliary carriages parallel to said transverse plane.

7. A curve correlator for determining the longitudinal displacement of a pair of transversely separated curves comprising: a frame; a pair of principal carriages supported by said frame for movement in a reference plane parallel to an object plane wherein the curves to be compared may be viewed, and disposed on opposite sides of a plane transverse to said reference plane; a pair of auxiliary carriages individually supported for movement relative to one of said principal carriages in a direction parallel to said transverse plane; a pair of optical elements individually mounted on one of said auxiliary carriages, and said optical elements including means for intercepting and redirecting light from said observed plane in opposite directions parallel to said reference and said transverse planes; means for directing light from each of said optical elements toward an image plane including a first pair of reflectors individually spaced from one of said optical elements in a corresponding one of said opposite directions for reflecting light from said optical elements toward said transverse plane and individually mounted on one of said principal carriages, a second pair of reflectors disposed essentially in said transverse plane for reflecting light from said first pair of reflectors toward a selected location in said reference plane and said transverse planes and supported by said frame, and an image-superposing element positioned at said location and supported by said frame; means ganging said principal carriages for simultaneous but opposite relative movement perpendicular to said transverse plane for displacing the images of the curves at said image plane into substantially transverse alignment; means ganging said auxiliary carriages for simultaneous but opposite relative movement parallel to said transverse plane for displacing the images of the curves at said image plane into substantially longitudinal alignment; and means for indicating relative displacement of said auxiliary carriages parallel to said transverse plane.

References Cited in the file of this patent

UNITED STATES PATENTS

| | | |
|---|---|---|
| 2,313,978 | Toepfer | Mar. 16, 1943 |
| 2,672,786 | Capstaff | Mar. 23, 1954 |